United States Patent
Kohl et al.

(10) Patent No.: US 8,876,515 B2
(45) Date of Patent: Nov. 4, 2014

(54) SYSTEM AND METHOD FOR CUSTOMIZING A FOOD TRAY

(75) Inventors: Todd E. Kohl, West Lafayette, OH (US); Raymond P. Mozes, Hadley, PA (US)

(73) Assignee: Jones-Zylon Company, West Lafayette, OH (US)

( * ) Notice: Subject to any disclaimer, the term of this patent is extended or adjusted under 35 U.S.C. 154(b) by 399 days.

(21) Appl. No.: 13/210,885

(22) Filed: Aug. 16, 2011

(65) Prior Publication Data

US 2012/0040327 A1 Feb. 16, 2012

Related U.S. Application Data

(60) Provisional application No. 61/374,161, filed on Aug. 16, 2010.

(51) Int. Cl.
*B29C 33/30* (2006.01)
*B29C 45/26* (2006.01)
*B29L 31/00* (2006.01)
*B29C 51/36* (2006.01)

(52) U.S. Cl.
CPC ..... *B29C 45/2673* (2013.01); *B29C 2045/2677* (2013.01); *B29L 2031/7404* (2013.01); *B29C 51/36* (2013.01)
USPC .......................... 425/190; 425/185; 425/192 R

(58) Field of Classification Search
CPC ................. B29C 45/2673; B29C 51/36; B29C 2045/2677; B29L 2031/7404
USPC ....................................... 425/185, 190, 192 R
See application file for complete search history.

(56) References Cited

U.S. PATENT DOCUMENTS

| | | | | |
|---|---|---|---|---|
| 3,380,121 | A | * | 4/1968 | Chittenden et al. ........... 425/528 |
| 3,861,640 | A | * | 1/1975 | Agneta ......................... 249/102 |
| 3,871,611 | A | | 3/1975 | Taketa |
| 4,151,976 | A | | 5/1979 | Schurman |
| 4,155,692 | A | * | 5/1979 | Kermoian ..................... 425/292 |
| 4,452,419 | A | * | 6/1984 | Saleeba ....................... 249/53 R |
| 4,551,084 | A | | 11/1985 | Lake |
| 4,641,270 | A | * | 2/1987 | Lalloz et al. .................... 700/98 |
| 4,964,514 | A | | 10/1990 | Wycech |
| 5,120,480 | A | | 6/1992 | Anderson |
| 5,282,733 | A | * | 2/1994 | Noritake et al. .............. 425/183 |
| 5,543,103 | A | | 8/1996 | Hogan et al. |
| 5,662,946 | A | | 9/1997 | Pratt et al. |
| 5,705,203 | A | * | 1/1998 | Andersen et al. ............. 425/407 |

(Continued)

*Primary Examiner* — Yogendra Gupta
*Assistant Examiner* — Emmanuel S Luk
(74) *Attorney, Agent, or Firm* — Hahn Loeser & Parks LLP

(57) ABSTRACT

The subject invention provides systems and methods for customizing the arrangement of a food tray. The system includes a demonstration unit having a boundary defining a desired shape for a food tray, and components representing a segment of a food tray. Each of the components may be adapted to be arrangeable within the boundary with a subset of the plurality of components as desired to form a food tray arrangement. The system further includes a modular mold adapted to receive a sub-mold inserts in configurable arrangements, and the sub-mold inserts. Each sub-mold insert may correspond to one of the selection of components, and may be adapted to be positioned within the modular mold in a plurality of arrangements. The method includes providing a demonstration unit having a boundary that defines a desired shape for a food tray, and providing components each representing a segment of a food tray.

14 Claims, 17 Drawing Sheets

(56) References Cited

U.S. PATENT DOCUMENTS

| | | | |
|---|---|---|---|
| 5,736,168 A * | 4/1998 | Goyal et al. | 425/183 |
| 5,824,249 A * | 10/1998 | Leitch et al. | 264/219 |
| 5,851,563 A * | 12/1998 | Hoffman | 425/175 |
| 6,116,886 A * | 9/2000 | Tasaka | 425/183 |
| 6,328,552 B1 * | 12/2001 | Hendrickson et al. | 425/188 |
| 6,413,074 B1 * | 7/2002 | Hays | 425/398 |
| 6,444,148 B2 | 9/2002 | Harding | |
| 6,537,053 B1 | 3/2003 | Watkins | |
| 6,673,281 B1 | 1/2004 | Yourist | |
| 6,780,362 B1 * | 8/2004 | Story et al. | 264/219 |
| 7,031,788 B2 | 4/2006 | Shenefelt et al. | |
| 7,204,685 B1 | 4/2007 | Crain et al. | |
| 7,241,405 B1 * | 7/2007 | Crain et al. | 264/39 |
| 7,357,886 B2 | 4/2008 | Groth | |
| 7,500,843 B2 * | 3/2009 | Crain et al. | 425/185 |
| 7,866,972 B2 * | 1/2011 | Kuo | 425/192 R |
| 7,980,112 B2 * | 7/2011 | Boersma | 72/482.91 |
| 2005/0082706 A1 * | 4/2005 | Nagaoka et al. | 264/40.1 |
| 2008/0042316 A1 | 2/2008 | Geiger | |
| 2008/0105996 A1 | 5/2008 | Kloeb et al. | |

* cited by examiner

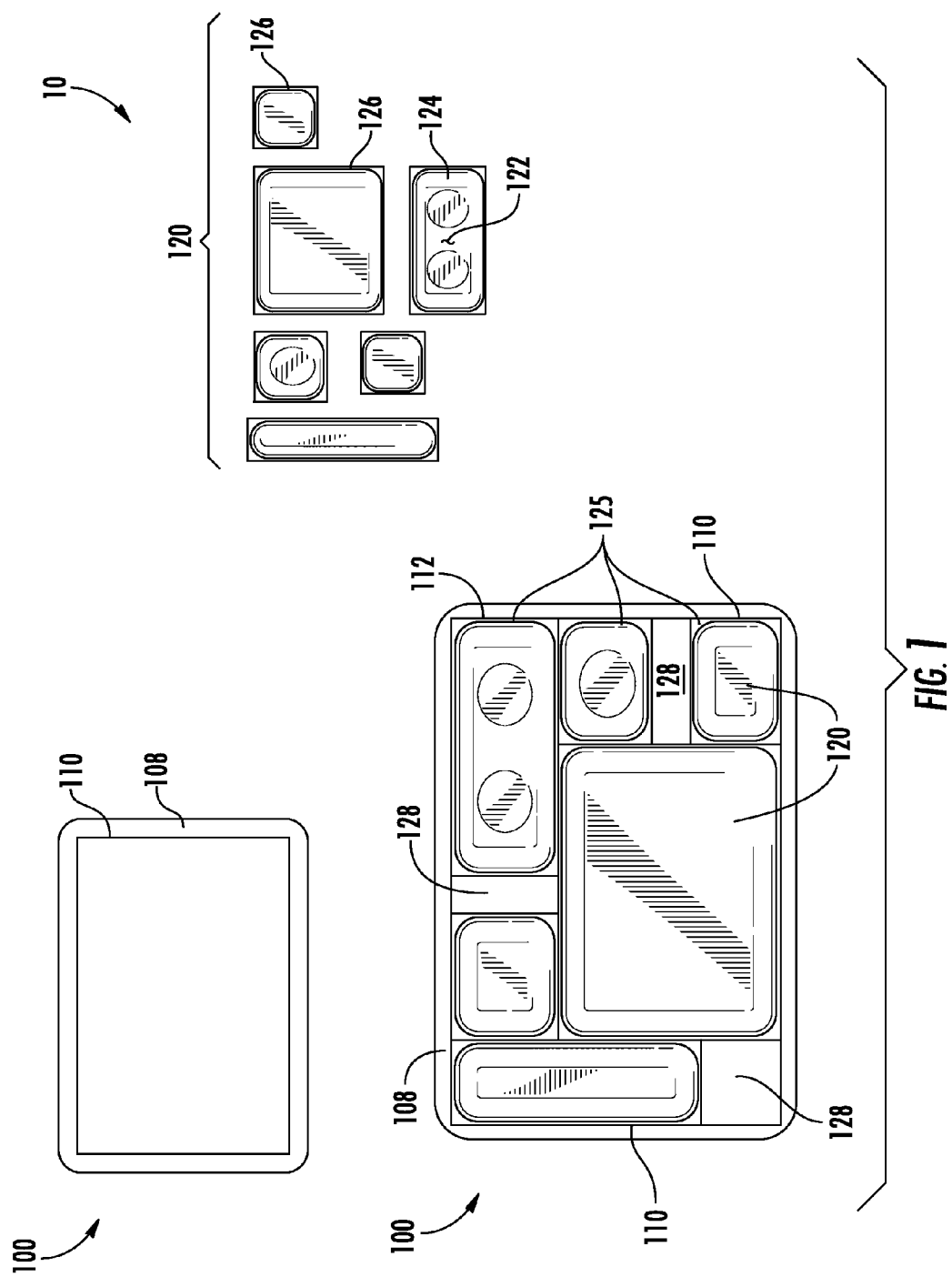

80e

SYSTEM AND METHOD FOR CUSTOMIZING A FOOD TRAY

This application claims priority to and the benefit of U.S. Provisional Patent Application 61/374,161, filed on Aug. 16, 2010, which is incorporated herein by reference.

TECHNICAL FIELD

The present invention relates to a system for customizing a food tray. More particularly, certain embodiments relate to providing a demonstration unit corresponding to the shape of a tray, arranging selected food tray components with the demonstration unit for creating the customized food tray arrangement, and molding a customized food tray according to the customized food tray arrangement in a modular insert mold.

BACKGROUND

Food service facilities (e.g., hospitals and correctional facilities) often provide meals to a large number of individuals using food trays. Some of these trays are disposable, while others are reusable. Certain types of food trays are manufactured using injection molding. The cost of an injection mold suitable for molding a tray is relatively high, requiring the production and sale of a high volume of trays to amortize the cost. In the past, molders produced trays based on the common needs of many facilities together to provide enough sales volume to be commercially feasible. However, many food service facilities have needs for food trays that are different from standardized trays, particularly in layout and design, yet one food service facility typically cannot afford the high volume of trays required to justify a new injection mold for a customized tray. As such, in the past it has not been commercially feasible to design and build a customized mold for the relatively low tray volumes needed by one facility.

Typically, the standardized food trays offer a basic layout of a food tray. This layout may include one compartment for a drink, a compartment for an solid entrée, a compartment for a side dish, and may include a compartment for flatware. In some facilities, certain of these compartments may never be used due to the facilities' particular needs. For example, a facility that serves soup may need a soup compartment, and may not be able to utilize a compartment for meat or other solid entrée products. As such, facilities may have to handle soup bowls separately to serve with standardized food trays that are not designed to handle bowls. Similarly, depending on the needs of the facility, various compartments on a standardized food tray are underutilized, causing work-arounds in serving and other inefficiencies. There remains a need for a customizable food trays to meet the needs of each facility in a cost effective manner thereby reducing the inefficiency and work-arounds created by mis-matched or unused tray compartments.

SUMMARY OF THE DISCLOSURE

Disclosed is a system for customizing the arrangement of a food tray comprising a demonstration unit comprising a boundary defining a desired shape for a food tray; and a plurality of components each representing a segment of a food tray, each of the plurality of components selectively arrangeable within the boundary with at least a subset of the plurality of components as desired to form a food tray arrangement.

The system may further include
a modular mold operable to selectively receive a plurality of sub-mold inserts in a plurality of configurable arrangements;
a plurality of sub-mold inserts, each sub-mold insert corresponding to one of said selection of the plurality of components; each sub-mold insert adapted to be operatively positioned within the modular mold in a plurality of arrangements; and
wherein said sub-mold inserts operatively positioned in the modular mold in an arrangement corresponding to the desired food tray arrangement form a tray mold corresponding to the desired food tray arrangement.

Also disclosed is a method of customizing the arrangement of a food tray comprising the steps of:
providing a demonstration unit comprising a boundary defining a desired shape for a food tray;
providing a plurality of components each representing a segment of a food tray, each of the plurality of components selectively arrangeable within the boundary with at least a subset of the of the plurality of components as desired to form a food tray arrangement; and
receiving an arrangement of a selected subset of the plurality of components within said boundary forming the food tray arrangement.

The method may further include
providing a modular mold operable to selectively receive a plurality of sub-mold inserts in a plurality of configurable arrangements;
providing said plurality of sub-mold inserts, each sub-mold insert corresponding to one of said selection of the plurality of components; each sub-mold insert adapted to be operatively positioned within the modular mold in a plurality of arrangements;
operatively positioning the sub-mold inserts in the modular mold in an arrangement corresponding to the desired food tray arrangement forming a tray mold corresponding to the desired food tray arrangement; and
molding food trays corresponding to the desired food tray arrangement utilizing the tray mold.

BRIEF DESCRIPTION OF THE DRAWINGS

FIG. 1 is a diagrammatical top view of a system for customizing a food tray according to an embodiment of the subject invention.

DETAILED DESCRIPTION OF THE DRAWINGS

Figure 1A:
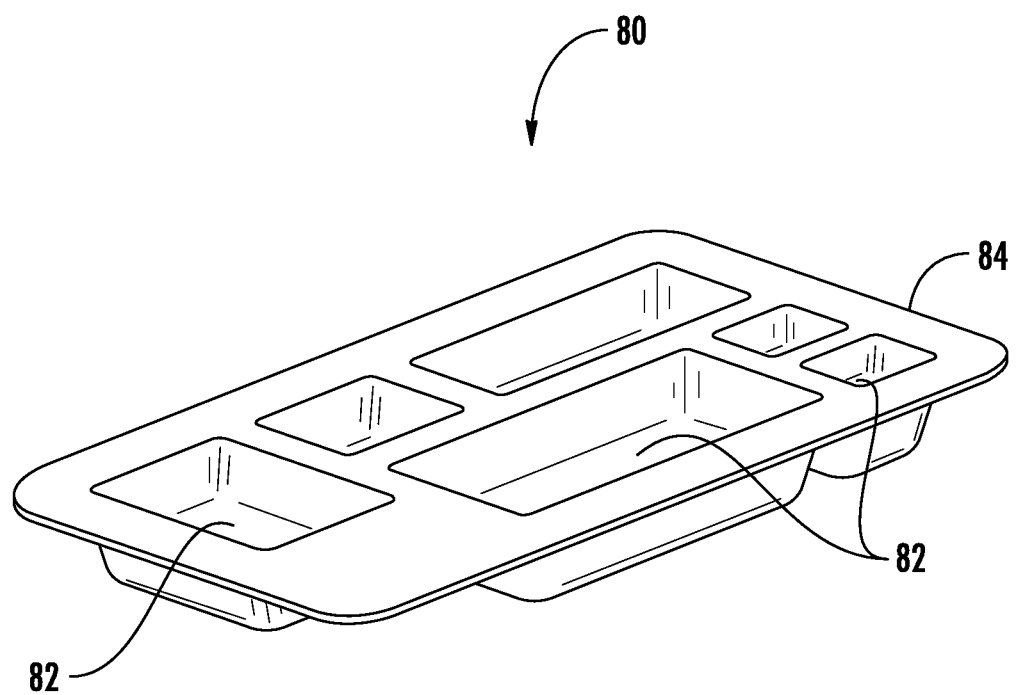
FIG. 1a is a perspective view of one embodiment of a customized food tray arranged according to the present system and method for customizing a food tray.

With reference to FIGS. 1 and 1*a*, a system for customizing the arrangement of a food tray is generally identified in FIG. 1 by reference numeral 10 for producing a customized food tray 80, such as shown for example in FIG. 1*a*, having an outer flange or tray rim 84 and a plurality of tray segments 82. Each tray segment 82 includes a section of a food tray, such as a food serving compartment, a cup holder, or the like, such that the plurality of tray segments 82 together form an interior portion of the food tray. The system 10 may include a demonstration unit 100 having a boundary 110 representative of the bounds of a customizable interior portion of the tray, and a plurality of sectional components 120 adapted to be arrangeable within the boundary 110 as discussed below. The demonstration unit 100 may include a frame 108 representing the outer rim or flange of the food tray and having the boundary 110 therein defining at least the customizable interior portion of the tray. The demonstration unit frame 108 and its boundary 110 are adapted for arranging selected sectional components 120 within the boundary 110 to define the customized food tray.

Each of the plurality of sectional components 120 is representative of a corresponding tray segment 82. The plurality of sectional components 120 may include components representing various differently configured tray segments 82. For example, one of the plurality of sectional components 120 may represent a cup holder tray segment 82 for a desired size beverage. Another of the plurality of sectional components 120 may, for example, represent an eating utensil holder tray segment 82 (i.e., for a fork, knife, spoon etc.). Other sectional components 120 may include, for example, a bowl component, component for an entrée compartment, a component for a six ounce side serving compartment, a component for an eight ounce side serving compartment, and various other components representing differently sized and shaped components as desired representing the various tray components one may choose from when defining a customized food tray. Each sectional component 120 is modularly shaped such that each sectional component 120 is arrangeable within the boundary 110 with other sectional components 120. For certain selections and arrangements of the sectional components 120 within the boundary 110, the area within the boundary may not be fully filled. To fill spaces between sectional components, or between sectional components and the boundary, one or more of the plurality of sectional components 120 may be a spacer 128 having a size and shape to use as a filler between sectional components 120 or between sectional components 120 and the boundary 110 such that the area within the boundary is effectively used. For example, the demonstration unit 100 may include 15 to 20 sectional components 120 of various sizes, shapes, and configurations, of which various subsets or subcombinations of between, for example, 3 to 10 sectional components 120 fit together to fill the area within the boundary 110 in desired food tray arrangements. The sectional components 120 may have a three dimensional size and shape the same as the corresponding tray segment. Alternatively, the sectional components may be flat representations of the tray segments having a size reflecting a plan view of the tray segment, including a photo, image, and/or text describing the tray segment, not unlike a puzzle piece.

In use, the system 10 is presented to an arranger, such as customer, who then selects a desired number of sectional components 120, which may be a subset 125 of the total number of sectional components 120 in the system, for arrangement within the boundary 110. The subset 125 may include between about 3 and 10 sectional components 120 that will together fill the space within the boundary 110 without overlapping one another. Then, the arranger arranges the subset 125 in a desired order within the boundary 110 providing a customized arrangement of a tray. Then, as discussed below, the customized arrangement may be used to configure a mold for making the customized food tray. As an example, from the total number of sectional components 120 presented to choose from, an arranger may select a component for an entrée compartment, two components for a six ounce side serving compartment, a component for a cup holder, and a component for a utensil compartment. The arranger arranges the selected subset of components within the boundary 110 in a desired arrangement with filler components filling the remainder of the space within the boundary 110. The boundary 110 limits the size and shape of the arrangement for the customizable food tray, as only a certain number of sectional components 120 will fit within the boundary, the number of sectional components within the boundary depending upon the size of the sectional components selected and the location each component is desired to be placed within the boundary.

With continued reference to FIG. 1, the plurality of sectional components 120 may be made from a thermoplastic material. The plurality of sectional components 120 may each include a base 122, and walls 124 extending upward from the base 122 representing the shape of the desired tray component. Each of the plurality of sectional components 120 may further include a flange 126 corresponding with at least one edge of the boundary 110 and extending outwardly from the uppermost part of the walls 124.

Figure 2:
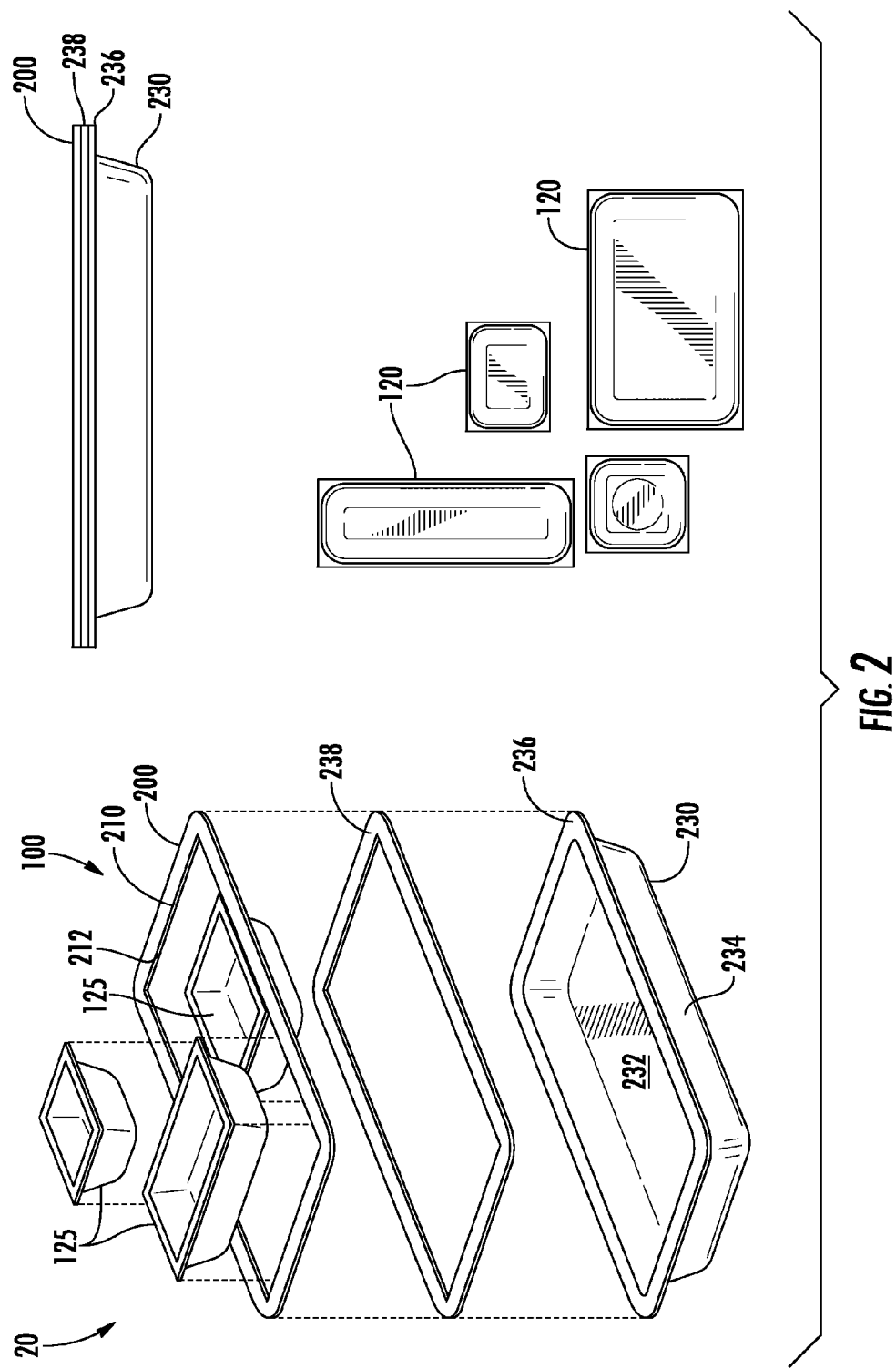
FIG. 2 is a schematic diagram of a second example of a demonstration unit according to an embodiment of the subject invention.

FIG. 2 illustrates a system 20 with an alternative embodiment of a demonstration unit 100 for customizing a tray. The system 20 may be similar to the system 10 of FIG. 1 except that, in this embodiment, the frame 108 of the demonstration unit 100 forms a rim 200 approximately representing the outer rim of the tray, and having an aperture 210 having a perimeter 212 forming the boundary 110 corresponding to the shape of the interior portion of the tray. In this embodiment, a selected subset 125 of the sectional component 120 may be arranged within the aperture 210 for creating a customized arrangement of a tray. In use, an arranger may place the rim 200 on a table and arrange the subset 125 within the aperture 210 and along the perimeter 212. Spacer components may be provided to fill gaps between components of the subset 125.

With continue reference to FIG. 2, the system 20 may further include a container 230 corresponding to the shape the rim 200. The container 230 may include a base 232 and walls 234 extending upwardly from the base 232 forming an opening to the container. The container 230 may further include a flange 236 extending outwardly from the uppermost portion of the walls 234. The rim 200 may be positioned on the flange 236, and the selected subset 125 of the sectional component 120 may be arranged within the container 230. Optionally, the container 230 may include a foam member 238 adapted to overlie at least a portion of the flange 236 to serve as an intermediary between the flange 236 and the rim 200. The rim 200 may cover at least a portion of the opening of the container 230. The walls 234 may have a height corresponding with the height of the sectional components 120 such that the flange 126 of the sectional components 120 may be coplanar with the rim 200.

Figure 3:
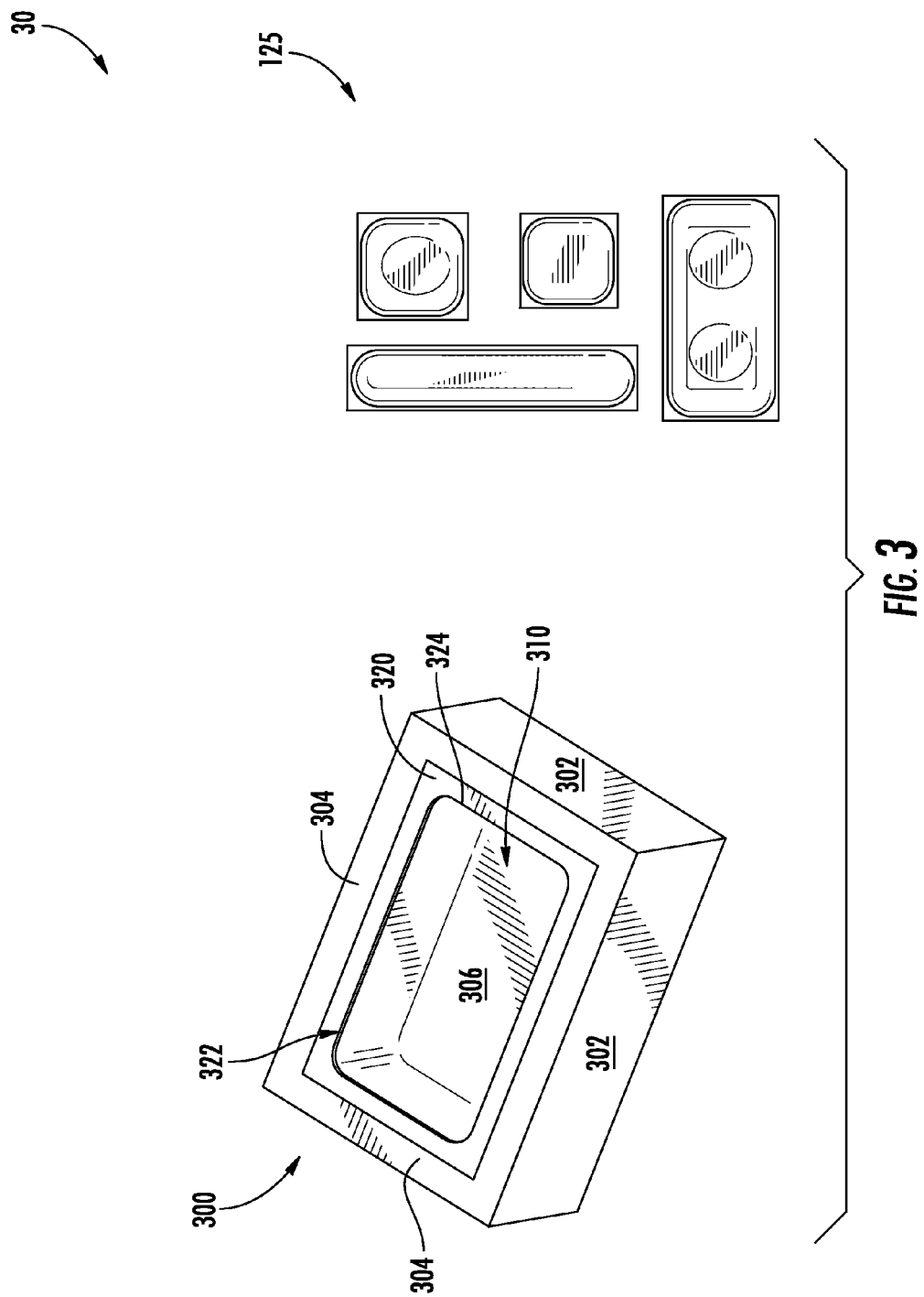
FIG. 3 is a schematic diagram of a third example of a demonstration unit according to an embodiment of the subject invention.

FIG. 3 illustrates a system 30 with a third embodiment of a demonstration unit 100 for customizing a tray. The system 30 may be similar to the system 10 of FIG. 1 and system 20 of FIG. 2 except that, in this embodiment, the demonstration unit 100 may be integrated into a housing 300. The housing 300 may include an outer wall or casing 302 of the housing 300. The outer wall or casing 302 may be made from any suitable material for a housing. In the embodiment illustrated in FIG. 3, the casing 302 is made from a thermoplastic material or aluminum. In one example, the housing 300 is a briefcase or other demonstration case for ease of transporting the system. The housing 300 may further include a substrate 304 forming the frame 108. The substrate 304 may be selectively attached to the casing 302 using an adhesive such as a liquid adhesive, tape or other material capable of securing the substrate 304 to the casing 302. The substrate 304 may be made from foam, thermoplastic, or a paper based material such as corrugated or cardboard. In the embodiment shown, the substrate 304 may define a recess 310 within the housing 300 having a perimeter 324 forming the boundary 110 corresponding to the inner portion of the tray. A liner 306 may be selectively attached to at least a portion of the substrate 304 using an adhesive (i.e., liquid or tape) or other suitable material capable of securing the liner 306 to the substrate 304. The liner 306 may be made from a thermoplastic material, a paper-base material (i.e., corrugated or cardboard) or other suitable material. In operation, for example, an arranger may select at least a subset 125 of the sectional components 120 for creating a customized arrangement of a tray. The arranger may then place the subset 125 of sectional components 120 within the recess 310 in a desired arrangement. Then, as will be discussed below, the customized arrangement may be used to create a tool for making the custom food tray.

Alternatively or in addition, the housing 300 may include a housing rim 320 having an aperture 322 corresponding to the shape of at least a portion of the opening of the recess 310. The aperture 322 further defines the perimeter 324 forming the boundary 110 corresponding to at least one edge of the plurality of sectional components 120.

Figure 4:
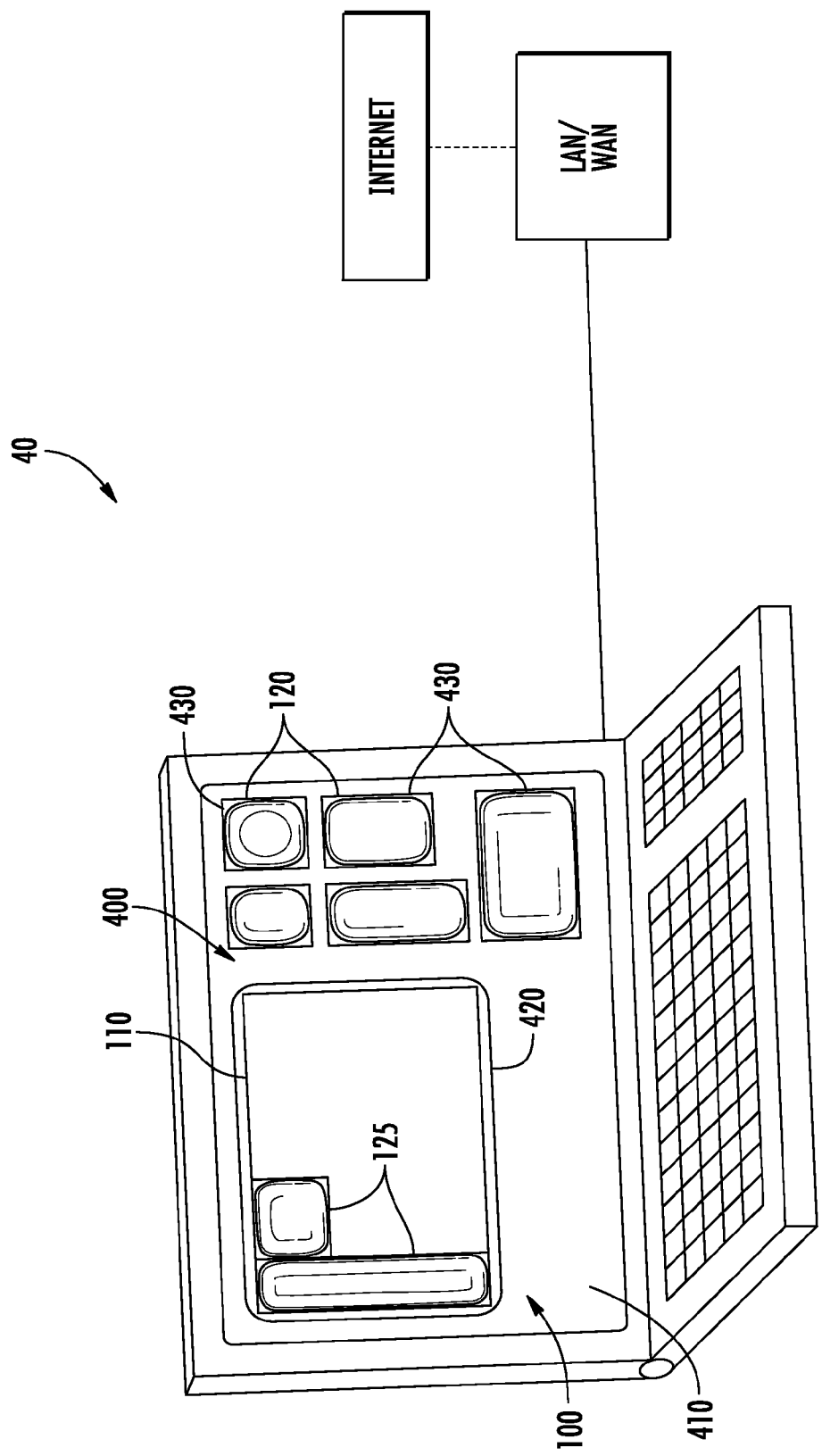
FIG. 4 is a schematic diagram of a forth example of a demonstration unit according to an embodiment of the subject invention.

FIG. 4 illustrates a system 40 with a fourth embodiment of a demonstration unit 100 for customizing a tray. The system 40 may be similar to the system 10 of FIG. 1, system 20 of FIG. 2, and system 30 of FIG. 3, except that, in this embodiment, the demonstration unit 100 may be digitally presented. In this embodiment, the demonstration unit 100 may be integrated into a software program 400 having a user interface 410 that provides an image 420 corresponding to the shape of a tray and providing the boundary 110 therein. The user interface 410 may represent each of the plurality of sectional components 120 as a selectable icon 430 or other graphical interface for selecting and arranging at least a selected subset 125 of the plurality of sectional components 120 to be placed within the boundary 110. The software program 400 may be accessed via a local area network, a wide area network, or both. Alternatively, the software program 400 may be web-based. In operation, a user accesses the software program 400 and is presented with the image 420. The user may select the sectional components 120 using the selectable icon 430 or other graphical interface by toggling through a selection of the plurality of sectional components, and/or selecting the selectable icon 430 corresponding to a desired component. The arranger may then arrange the selected sectional components 120 within the boundary 110 on the image 420 by either moving the subset 125 into the desired positions within the image 420 thereby creating a custom arrangement for the tray. The software program 400 may allow the user to view the finished tray, and may be used to calculate cost, material volume, or other features of the tray.

Figure 5:
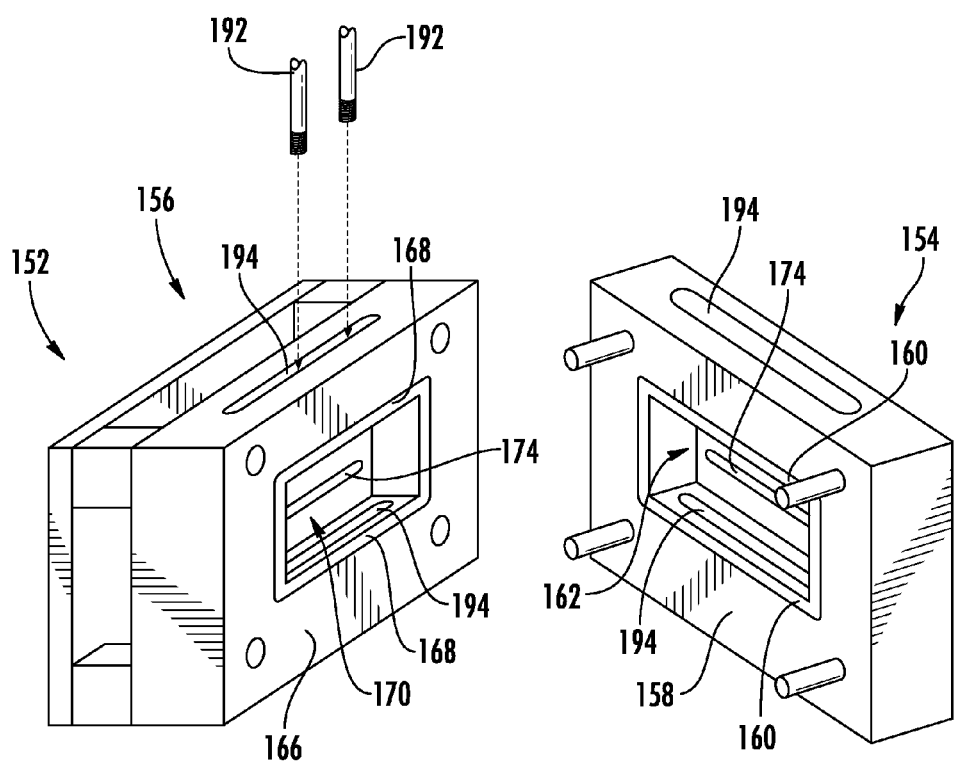
FIG. 5 is a perspective view of two portions of an modular injection mold of the present disclosure.

After the selected sectional components 120 are selected and arranged in a desired food tray arrangement, customized food trays corresponding to the selected food tray arrangement may be manufactured by injection molding using a modular insert injection mold 152 such as shown in FIG. 5. The modular injection mold 152 has a cavity side 154 and a core side 156. Typically, the cavity side 154 is also injection side of the mold affixed to a stationary platen of an injection molding machine (not shown), and the core side is affixed to a movable platen of the injection molding machine. The core side may be the ejection side of the mold and the cavity side may be the plastic injection side of the mold. However, it is contemplated that ejection of the part may be from the cavity side 154 or the core side 156, and the cavity side 154 and the core side 156 may be adapted for mounting in the injection molding machine as desired by one skilled in the art.

Figure 6:
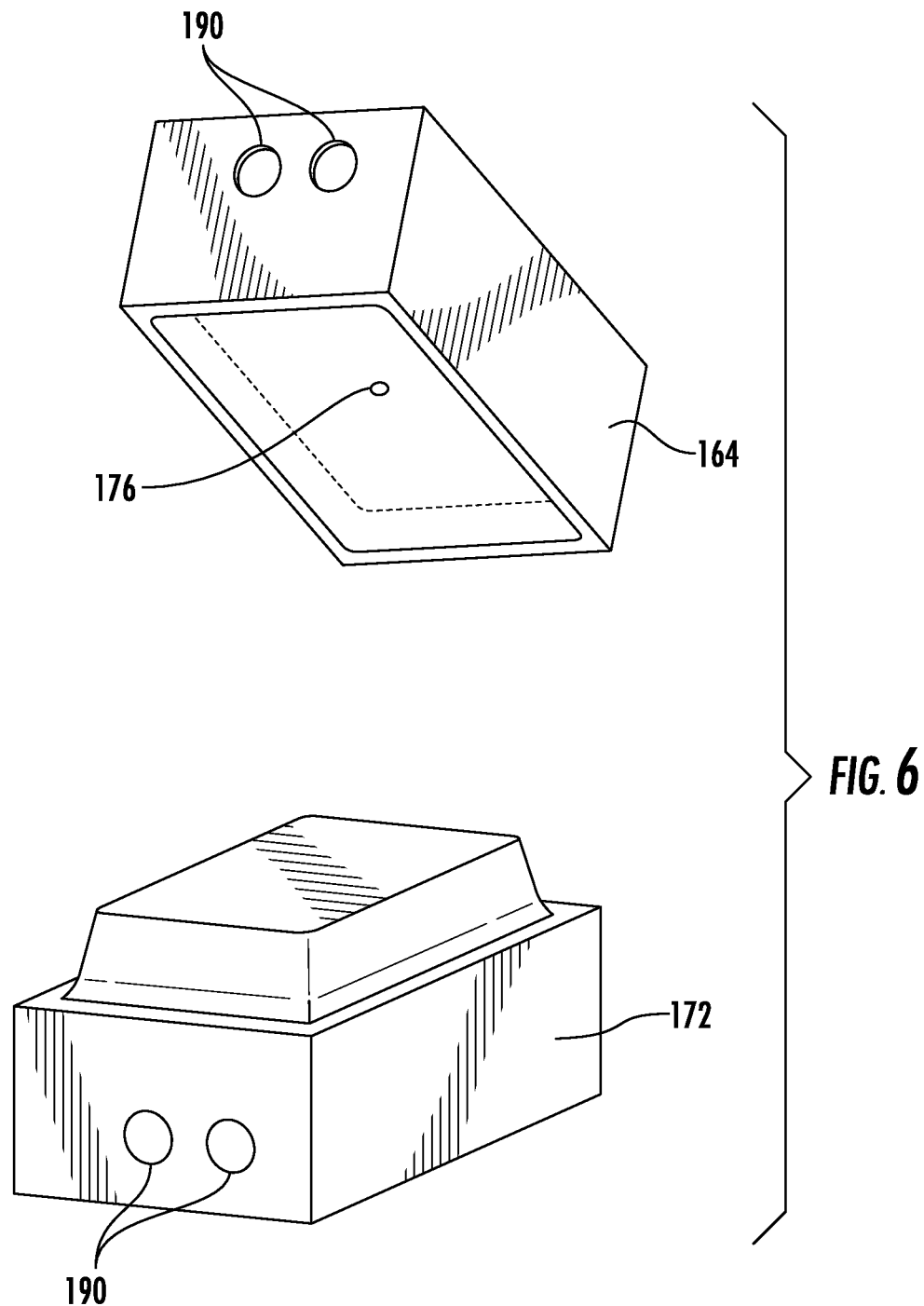
FIGS. 6 and 6A are alternative perspective views of two portions of a sub-mold insert for use with the modular mold of FIG. 5.

The modular injection mold 152 may be adapted to selectively receive a plurality of sub-mold inserts in a plurality of configurable arrangements, where each mold insert corresponds to one of the selection of the plurality of components in the demonstration unit, such as one example shown in FIG. 6. The cavity side 154 includes a cavity plate 158 having a rim cavity 160 corresponding to at least a portion of the shape of the tray rim 84. The rim cavity 160 may correspond, at least in part, to the surface of the underside of the tray rim 84. In the interior of the rim cavity 160, a cavity insert aperture 162 is provided adapted to selectively receive a plurality of sub-mold cavity inserts 164 in a plurality of configurable arrangements.

The core side 156 includes a mold plate 166 having a rim core 168 corresponding to at least a portion of the shape of the tray rim 84. The rim core 168 may correspond, at least in part, to the surface of the top of the tray rim 84. In the interior of the rim core 168, a core insert aperture 170 is provided adapted to selectively receive a plurality of sub-mold core inserts 172 in a plurality of configurable arrangements. The rim cavity 160 and rim core 168 are shaped such that when the modular injection mold 152 is closed the rim cavity and rim core form a cavity therebetween corresponding to the shape of the tray rim 84.

Figure 7:
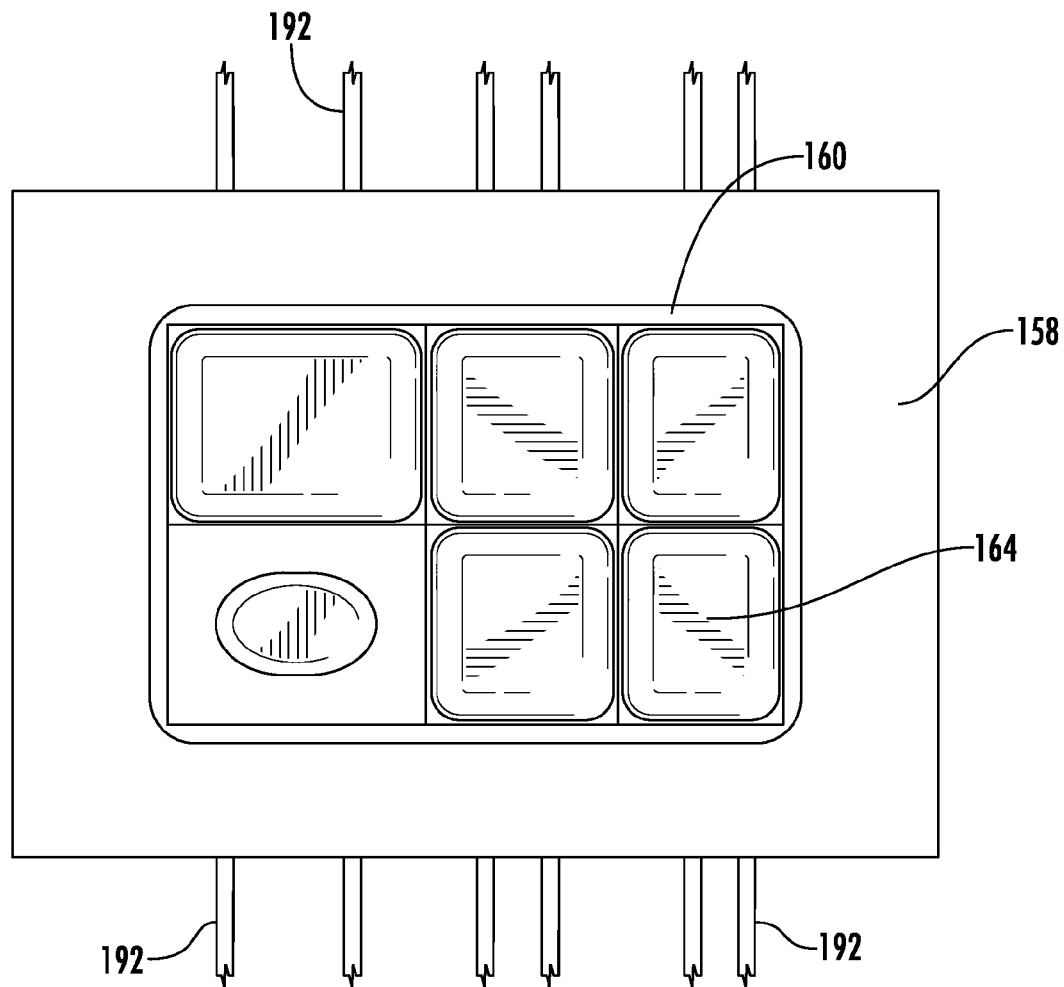
FIG. 7 is a plan view of the cavity side of the modular injection mold of FIG. 5 including a plurality of sub-mold inserts of FIG. 6.

Each sub-mold cavity insert 164 and sub-mold core insert 172 are shaped such that when closed in the modular injection mold 152 the mold cavity insert 164 and mold core insert 172 form a cavity therebetween in the shape of one of the selection of the plurality of sectional components in the demonstration unit. The mold cavity insert 164 and mold core insert 172 are rectangular in shape and modularly sized such that a plurality of mold cavity inserts and mold core inserts are arranged to precisely fit in the cavity and core insert apertures 162, 170 according to the selected food tray arrangement, such as shown in FIG. 7. Certain sub-mold inserts 164, 172 may be provided to fill spaces between food tray component mold inserts such that the cavity and core insert apertures 162, 170 are filled with sub-molds. One or more clamp bolts (not shown) may be provided through slots 174 in the mold plate 166 and cavity plate 158 extending to the cavity and core insert apertures 162, 170 to bolt the sub-mold inserts in place. It is contemplated that other clamping systems may be utilized to hold the sub-mold inserts in the apertures 162, 170.

The sub-mold inserts 164, 172 are provided such that when closed in the modular injection mold 152 in a plurality of various arrangement, the plurality of mold cavity inserts and plurality of mold core inserts form a continuous mold cavity therebetween in the shape of a food tray according to the arrangement. The sub-mold inserts 164, 172 contact each adjacent sub-mold insert and the edge of the cavity and core insert apertures 162, 170 to reduce fluid plastic flowing between the sub-mold inserts 164, 172 causing extra plastic, or flash, on the food trays.

The modular injection mold 152 is provided with one or more passages for the injection nozzle of the injection mold machine to inject molten plastic into the space between the mold cavity inserts 164 and mold core inserts 172 through a mold gate 176. The injection may be through one of the sub-mold cavity inserts 164, and the gate 176 in the mold cavity surface of the sub-mold cavity insert as shown in FIG. 6. Alternatively, the mold gate 176 may be provided in the rim cavity 160 as an edge gate.

The sub-mold cavity inserts 164 and sub-mold core inserts 172 may include cooling passages for cooling the mold inserts during molding. Fluid ports 190 may be provided on the sub-mold inserts, and corresponding cooling lines 192 attached to each cooled sub-mold insert 164, 172. In the application shown in FIGS. 6 and 7, each sub-mold cavity insert 164 and sub-mold core insert 172 is cooled independently from the other. The mold plate 166 and cavity plate 158 may include slots 194 positioned for cooling lines 192 to pass through to the outside of the mold such as shown in FIG. 7, where the cooling lines 192 are attached to a cooling system (not shown).

The molded tray may be ejected from the mold using part pulling mechanisms, ejector pins, ejection rings, or any other ejection mechanisms as desired. In one embodiment, a part pulling mechanism (not shown) may be provided in the proximity of the rim cavity 160 operable to pull the tray rim away from the mold as the injection mold opens.

Figure 6A:
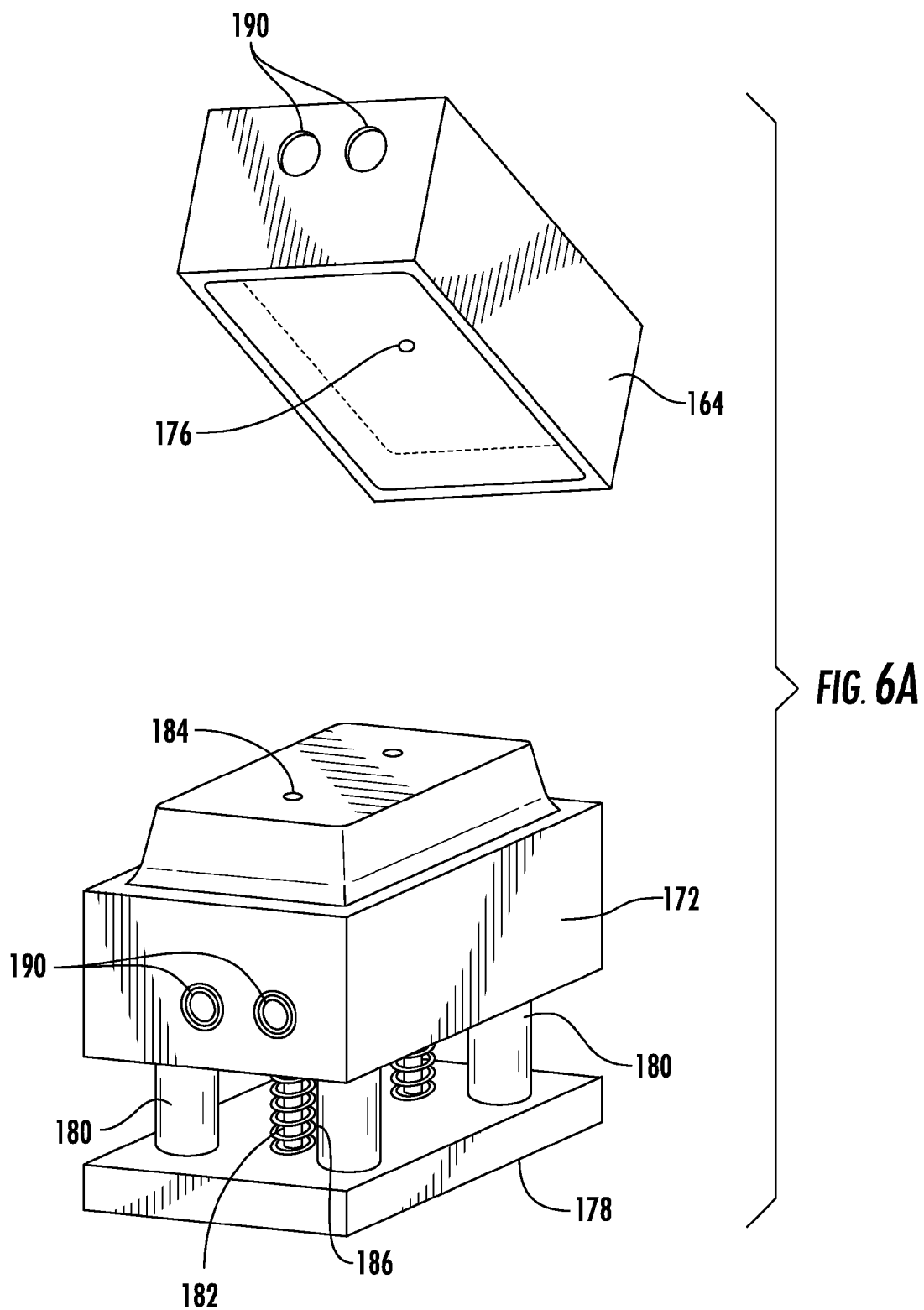

Alternatively or in addition, one or more mold core inserts 172 may be adapted for ejecting the molded food tray from the mold. In one alternative shown for example in FIG. 6A, the mold core insert 172 may include a sub-mold ejector plate 178 and a plurality of guide pins 180. One or more ejector pins 182 extend from the sub-mold ejector plate 178 to the core surface 184. One or more return springs 186 may be provided to assist the retraction of the ejector pins 182. The mold may include a mold ejector plate (not shown) operably positioned behind the mold plate 166. In one alternative, the sub-mold ejector plates 178 may be operably connected to the ejector plate such that actuation of the mold ejector plate presses against the sub-mold ejector plates 178, thereby actuating the ejection pins 182. In yet another alternative, one or more ejector pins may be actuated by the mold ejector plate in the proximity of the rim cavity 160. It is contemplated that other ejection mechanisms may be applied as desired by one skilled in the art.

The modular insert injection mold 152 may be utilized with a method including steps of providing a modular insert injection mold 152 adapted to selectively receive a plurality of sub-mold inserts 164, 172 in a plurality of configurable arrangements, providing said plurality of sub-mold inserts, each sub-mold insert corresponding to one of said selection of the plurality of components, each mold insert adapted to be operatively positioned within the mold base in a plurality of arrangements, and operatively positioning the mold inserts in the mold base in an arrangement corresponding to the desired food tray arrangement forming a tray mold corresponding to the desired food tray arrangement. Then, molding food trays corresponding to the desired food tray arrangement utilizing said mold by injecting fluid plastic material through the gate 176 into the mold cavity, cooling the material, and ejecting the customized food tray 80 from the mold.

The food trays may be molded in polypropylene, polycarbonate, polyethylene, polyester, ABS, thermoplastic elastomer, thermoplastic rubber, or other thermoplastic material as desired.

Figure 8:
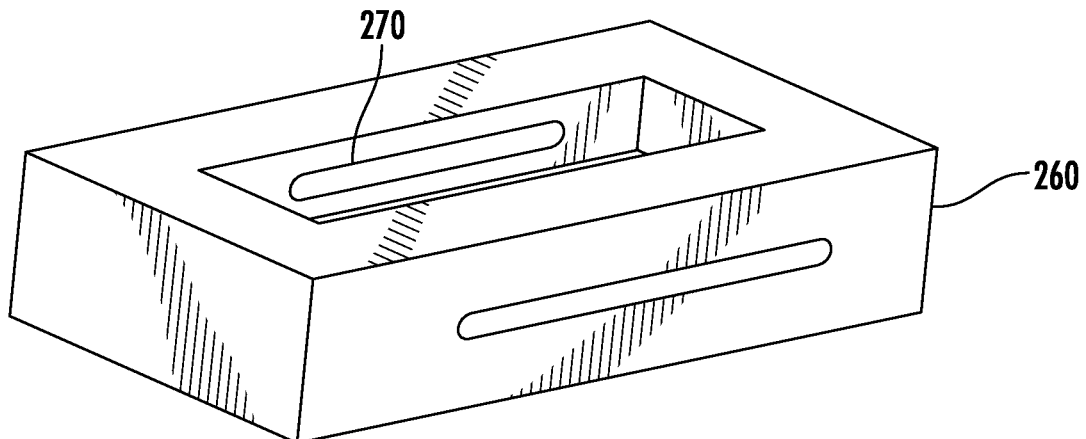
FIG. 8 is a is a perspective view of a modular thermoform mold of the present disclosure.
Figure 9:
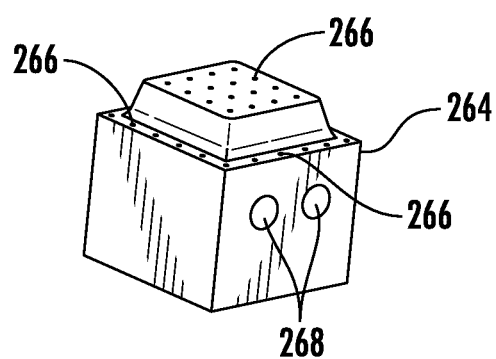
FIG. 9 is a perspective view of a sub-mold insert for use with the modular mold of FIG. 8.

Alternatively, the food trays may be manufactured by vacuum thermoforming using a modular insert thermoform mold 260 such as shown in FIG. 8. The modular insert thermoform mold 260 may be adapted to selectively receive a plurality of sub-mold inserts in a plurality of configurable arrangements, where each sub-mold insert corresponds to one of the selection of the plurality of components. The modular insert thermoform mold 260 includes an insert aperture 262 adapted to selectively receive a plurality of sub-mold thermoform inserts 264 in a plurality of configurable arrangements. The insert aperture 262 is positioned corresponding to the shape of the tray rim 84. Similar to the sub-mold inserts discussed above, each sub-mold thermoform inserts 264 corresponds to a desired food tray component, such as one example shown in FIG. 9. The sub-mold thermoform inserts 264 are rectangular in shape and modularly sized such that a plurality of sub-mold inserts are arranged to precisely fit in the aperture 262 according to the desired food tray arrangement. Certain sub-mold inserts 264 may be provided to fill spaces between food tray component sub-mold inserts such that the aperture 262 is filled with sub-molds. The sub-mold inserts 264 are provided such that the plurality of sub-mold inserts arranged in the aperture 262 form a continuous thermoform mold in the shape of a food tray according to the arrangement.

The sub-mold inserts may include vacuum holes 266 drilled there through such that when installed in the aperture 262 the vacuum holes 266 are in communication with a vacuum source provided through the thermoform mold 260.

The sub-mold inserts 264 may include cooling passages for cooling the mold inserts during molding. Fluid ports 268 may be provided corresponding to cooling passages 270 in the thermoform mold 260.

The modular insert thermoform mold 260 may be utilized with a method including steps of providing a modular insert thermoform mold 260 adapted to selectively receive a plurality of sub-mold inserts 264 in a plurality of configurable arrangements, providing said plurality of sub-mold inserts, each sub-mold insert corresponding to one of said selection of the plurality of components, each mold insert adapted to be operatively positioned within the mold base in a plurality of arrangements, and operatively positioning the mold inserts in the thermoform mold in an arrangement corresponding to the desired food tray arrangement forming a tray mold corresponding to the desired food tray arrangement. Then, molding food trays corresponding to the desired food tray arrangement utilizing said mold by drawing by vacuum a sheet of softened plastic material over the mold to take the shape of the mold.

After thermoform molding, the food tray is trimmed from the molded plastic sheet. A trim die (not shown) in the shape of the outer perimeter of the tray rim 84 may be provided to cut the customized food tray 80 from the sheet.

The vacuum-thermoformed food trays may be molded in polypropylene, polycarbonate, polyethylene, polyester, ABS, thermoplastic elastomer, thermoplastic rubber, or other thermoplastic material as desired.

Figure 10:
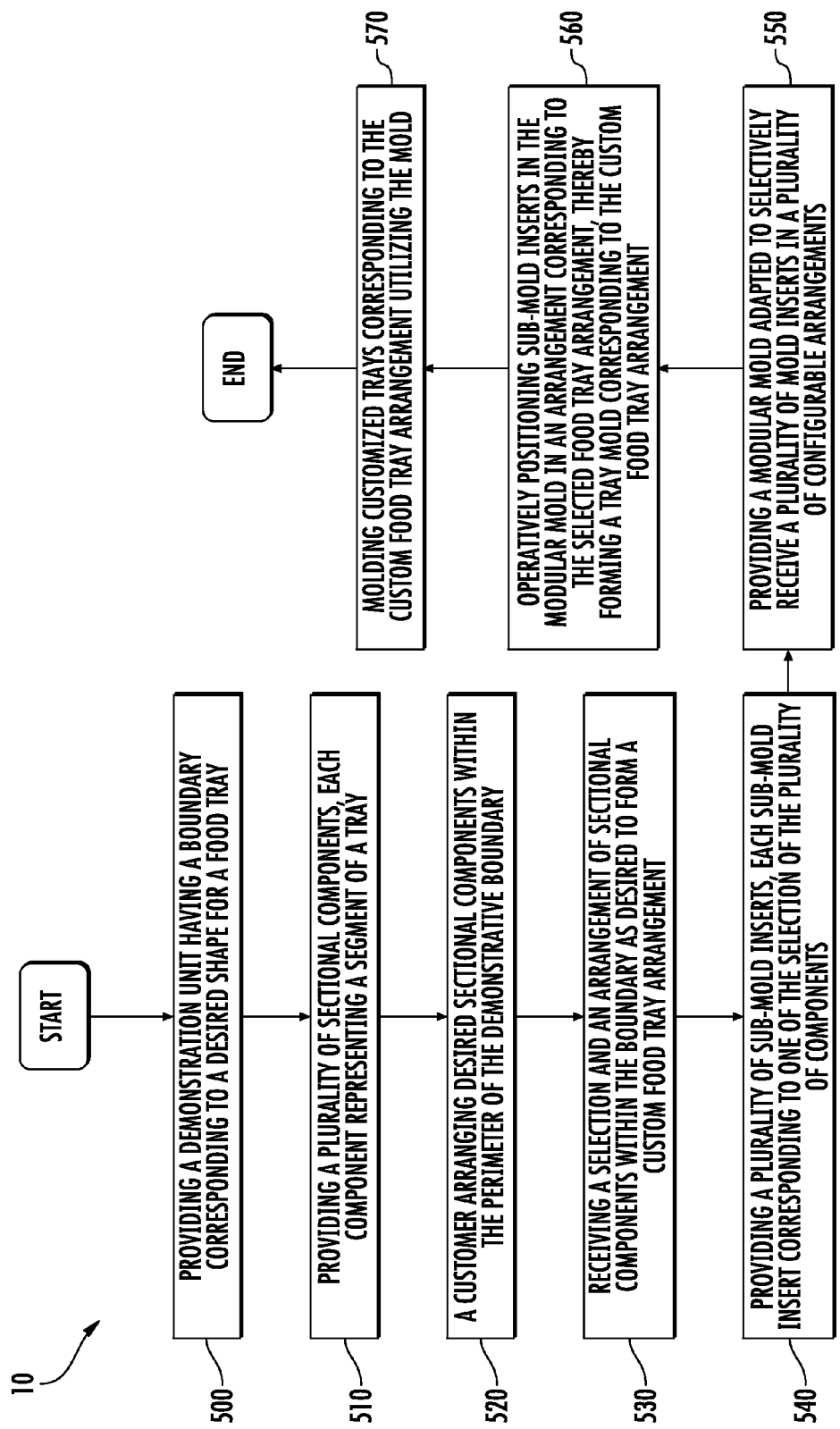
FIG. 10 is a flowchart of a first embodiment of a method for customizing a tray according to an embodiment of the subject invention.
Figure 11:
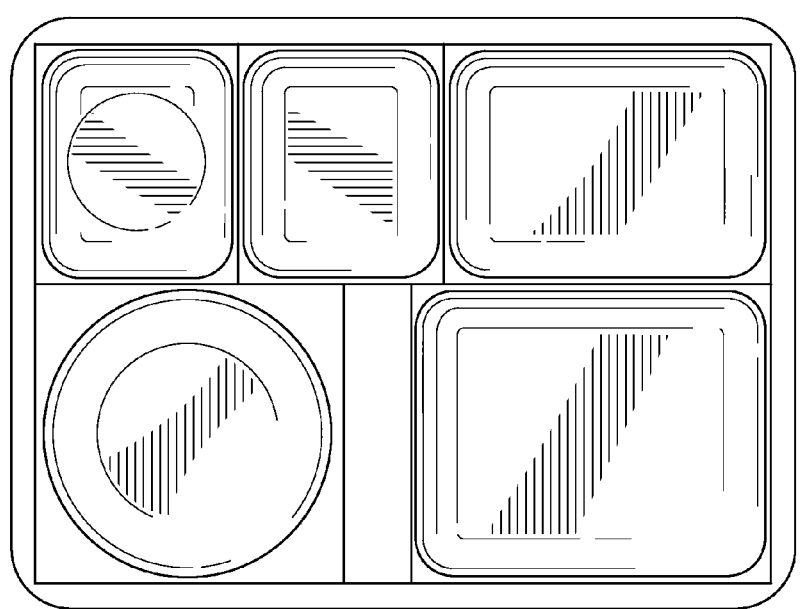
FIGS. 11 through 16 are views of alternative embodiments of food trays customized according to the present system and method of customizing a food tray.
Figure 11:
Figure 11:
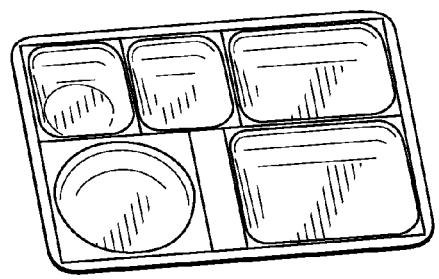
Figure 12:
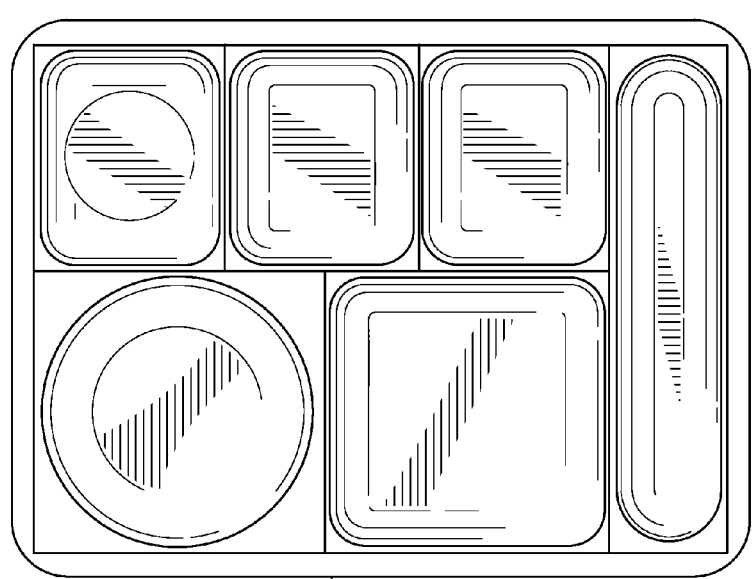
Figure 12:
Figure 12:
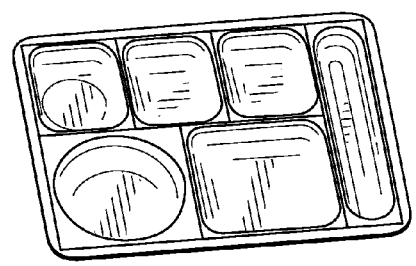
Figure 13:
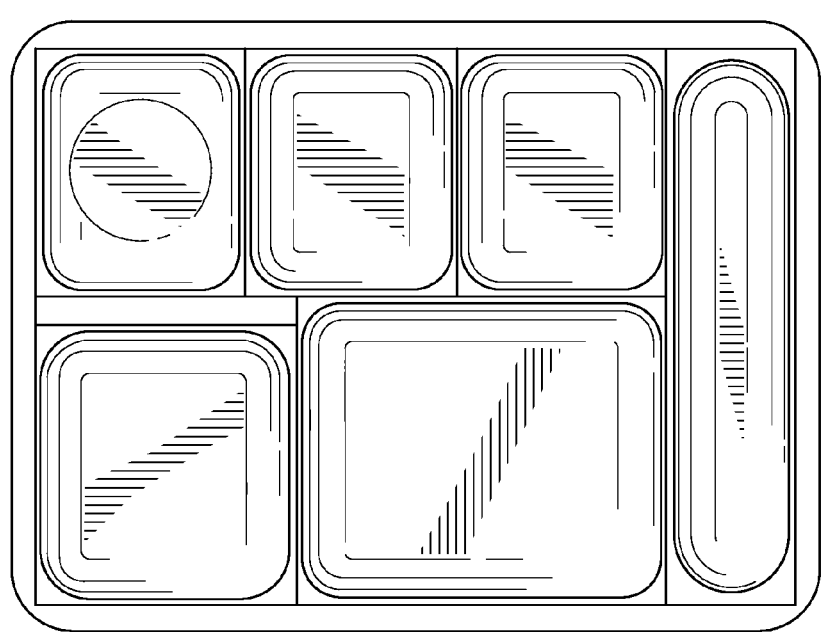
Figure 13:
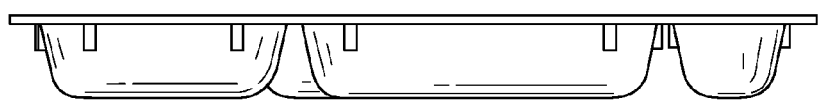
Figure 13:
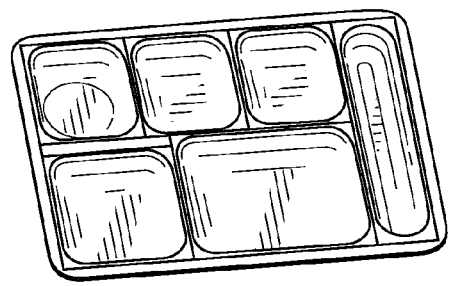
Figure 14:
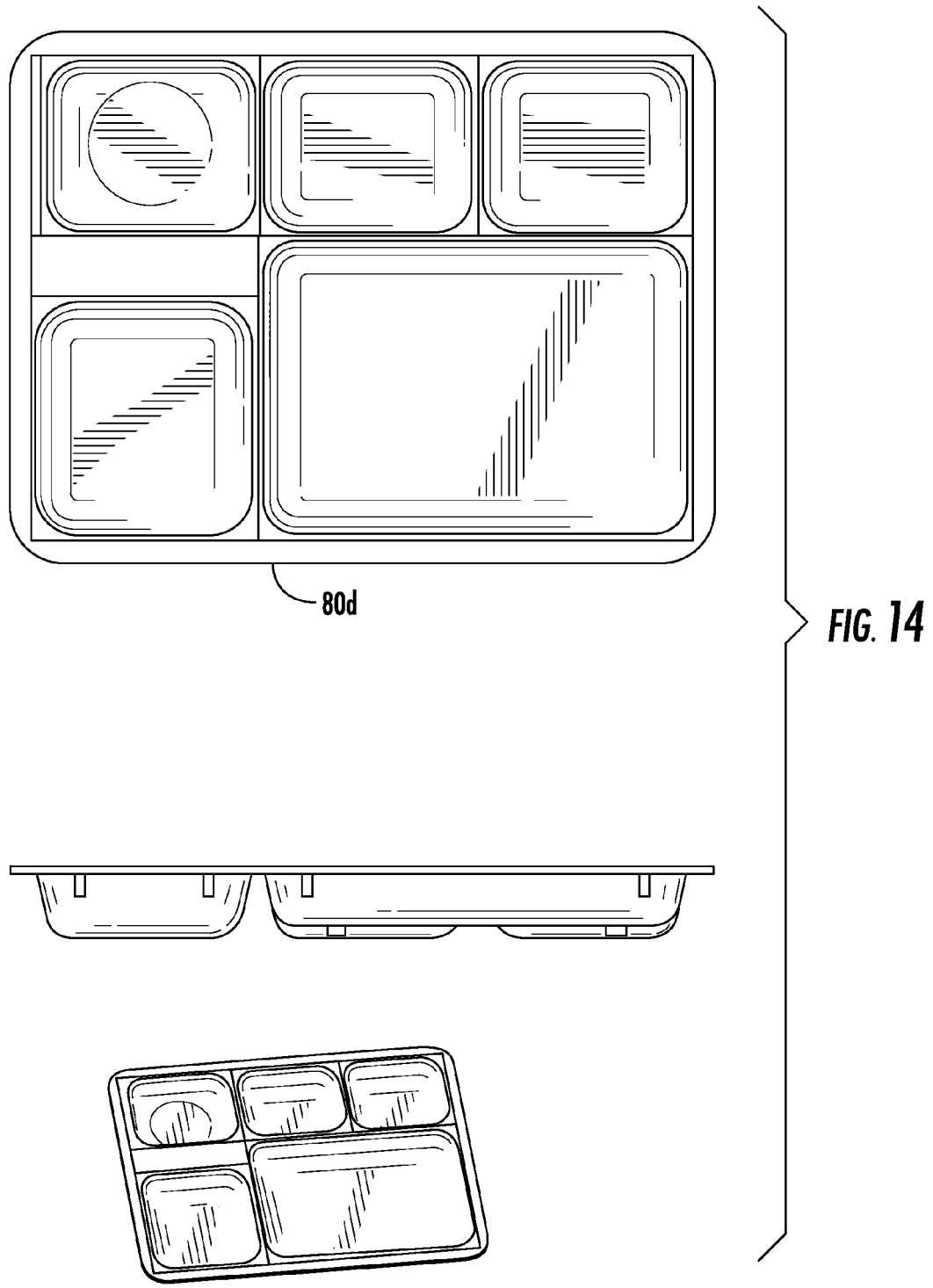
Figure 15:
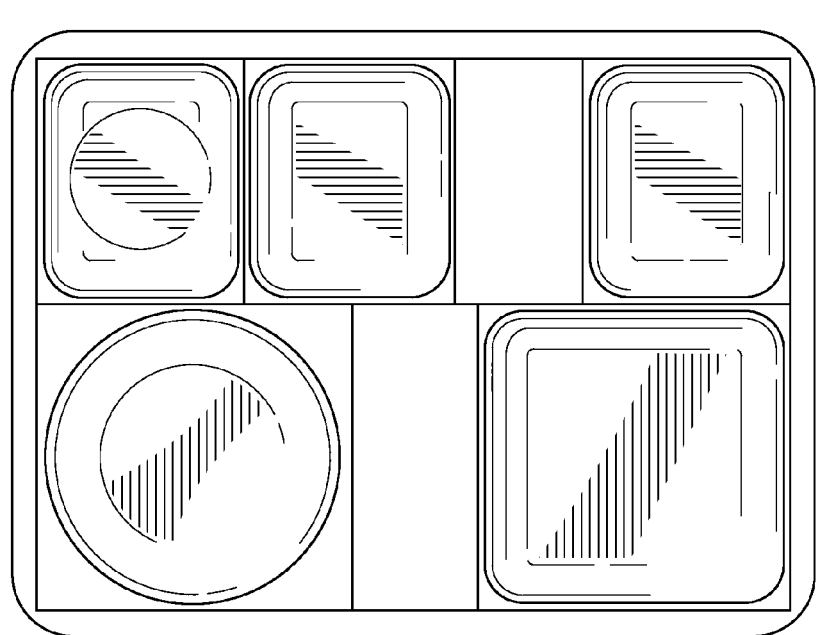
Figure 15:
Figure 15:
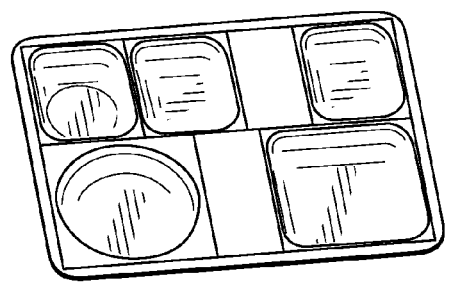
Figure 16:
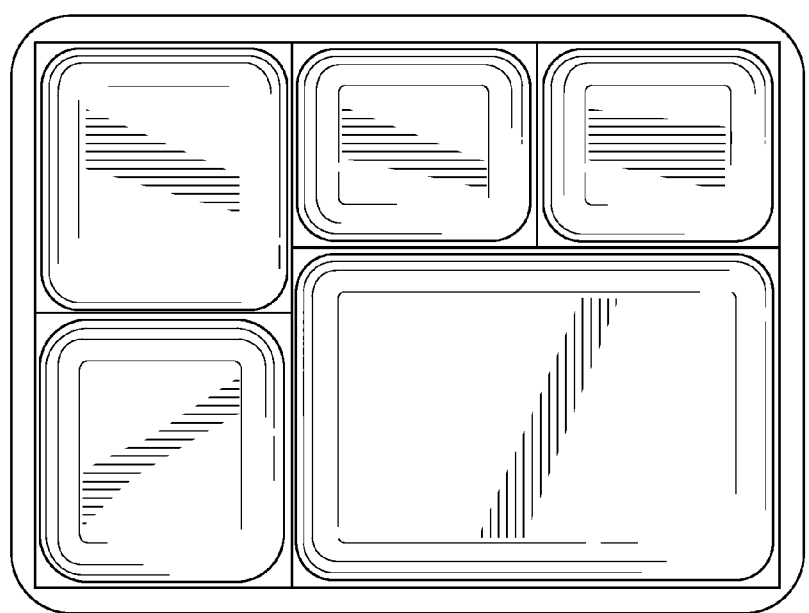
Figure 16:
Figure 16:
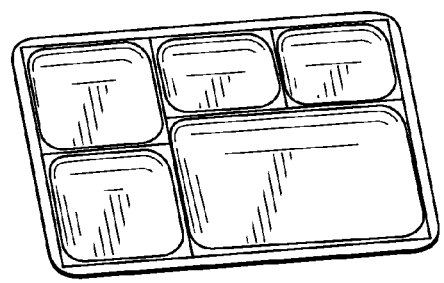

FIG. 10 illustrates a flowchart of an embodiment of a method of customizing a tray using the system 10, and variations thereof, disclosed herein. In step 500, providing the demonstration unit 100 having the boundary 110 corresponding to a desired shape for a food tray. In step 510, providing the plurality of sectional components, each component representing a segment of a tray. In step 520, receiving from an arranger a selection of at least a subset 125 of the plurality of sectional components for arranging within the boundary 110. In step 530, receiving an arrangement of the subset 125 within the boundary 110 as desired to form the custom food tray arrangement. In step 540, providing a modular mold 152, 260 adapted to selectively receive a plurality of sub-mold inserts 164, 172 in a plurality of configurable arrangements. In step 550, providing the plurality of mold inserts, each mold insert corresponding to one of the selection of the plurality of sectional components 120, and each sub-mold insert adapted to be operatively positioned within the modular mold in a plurality of arrangements. In step 560, operatively positioning the sub-mold inserts in the modular mold 152, 260 in an arrangement corresponding to the desired food tray arrangement, thereby forming a tray mold corresponding to the desired food tray arrangement. The tray mold may be an injection mold, or in the alternative a vacuum thermoform mold. In step 570, molding customized trays corresponding to the desired food tray utilizing the mold.

Various arrangements of food trays are contemplated customized according to the present system and method of customizing a food tray. As an example, views of alternative embodiments of food trays are shown in FIGS. 11 through 16 as reference numbers 80a through 80f. Various compartment shapes and sizes according to customer needs may be provided arrangeable within the present system and method to form many possible customized food tray arrangements as desired.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for customizing the arrangement of a food tray comprising: a demonstration unit comprising a boundary defining a desired shape for a food tray; and a plurality of components each representing a segment of a food tray, each of the plurality of components selectively arrangeable within the boundary with at least a subset of the plurality of components as desired to form a food tray arrangement, and a modular mold operable to selectively receive a plurality of sub-mold inserts in a plurality of configurable arrangements;
a plurality of sub-mold inserts, each sub-mold insert corresponding to one of said selection of the plurality of components; each sub-mold insert adapted to be operatively positioned within the modular mold in a plurality of arrangements; and wherein said sub-mold inserts operatively positioned in the modular mold in an arrangement corresponding to the desired food tray arrangement form a tray mold corresponding to the desired food tray arrangement.

2. The system of claim 1, wherein said demonstration unit further comprises: a rim having an aperture, said aperture having a perimeter forming the boundary.

3. The system of claim 2, wherein said demonstration unit further comprises: a container having as base and upwardly extending walls defining an opening of said container, wherein said rim is adapted to overlie said container, and said subset of the plurality of components arrangeable in said container.

4. The system of claim 1, wherein said demonstration unit further comprises: a housing having a substrate having a recess forming the boundary, and said subset of the plurality of components arrangeable in said recess.

5. The system of claim 1, wherein said demonstration unit further comprises: a video display displaying the boundary as an image, and where each of said plurality of arrangeable components is an image selectively arrangeable within the image of the boundary.

6. The system of claim 1, wherein said tray mold is an injection mold.

7. The system of claim 1, wherein said tray mold is a vacuum thermoform mold.

8. A method of customizing the arrangement of a food tray comprising the steps of:
providing a demonstration unit comprising a boundary defining a desired shape for a food tray; providing a plurality of components each representing a segment of a food tray, each of the plurality of components selectively arrangeable within the boundary with at least a subset of the of the plurality of components as desired to form a food tray arrangement; and receiving an arrangement of a selected subset of the plurality of components within said boundary forming the food tray arrangement; providing a modular mold operable to selectively receive a plurality of sub-mold inserts in a plurality of configurable arrangements; providing said plurality of sub-mold inserts, each sub-mold insert corresponding to one of said selection of the plurality of components; each sub-mold insert adapted to be operatively positioned within the modular mold in a plurality of arrangements; operatively positioning the sub-mold inserts in the modular mold in an arrangement corresponding to the desired food tray arrangement forming a tray mold corresponding to the desired food tray arrangement; and molding food trays corresponding to the desired food tray arrangement utilizing the tray mold.

9. The method of claim 8, wherein said demonstration unit further comprises; a rim having an aperture, said aperture having a perimeter forming the boundary.

10. The method of claim 9, wherein said demonstration unit further comprises: a container having a base and upwardly extending walls defining an opening of said container, wherein said rim is adapted to overlie said container, and said subset of the plurality of components arrangeable in said container.

11. The method of claim 8, wherein said demonstration unit further comprises: a housing having a substrate having a recess forming the boundary, and said subset of the plurality of components arrangeable in said recess.

12. The method of claim 8, wherein said demonstration unit further comprises: a video display displaying the boundary as an image, and where each of said plurality of arrangeable components is an image selectively arrangeable within the image of the boundary.

13. The method of claim 8, wherein said tray mold is an injection mold.

14. The method of claim 8, wherein said tray mold is a vacuum thermoform mold.

* * * * *